(No Model.) 6 Sheets—Sheet 1.
H. A. KELLER, W. G. COLE & J. E. GAYLORD.
ROASTING FURNACE.
No. 579,711. Patented Mar. 30, 1897.
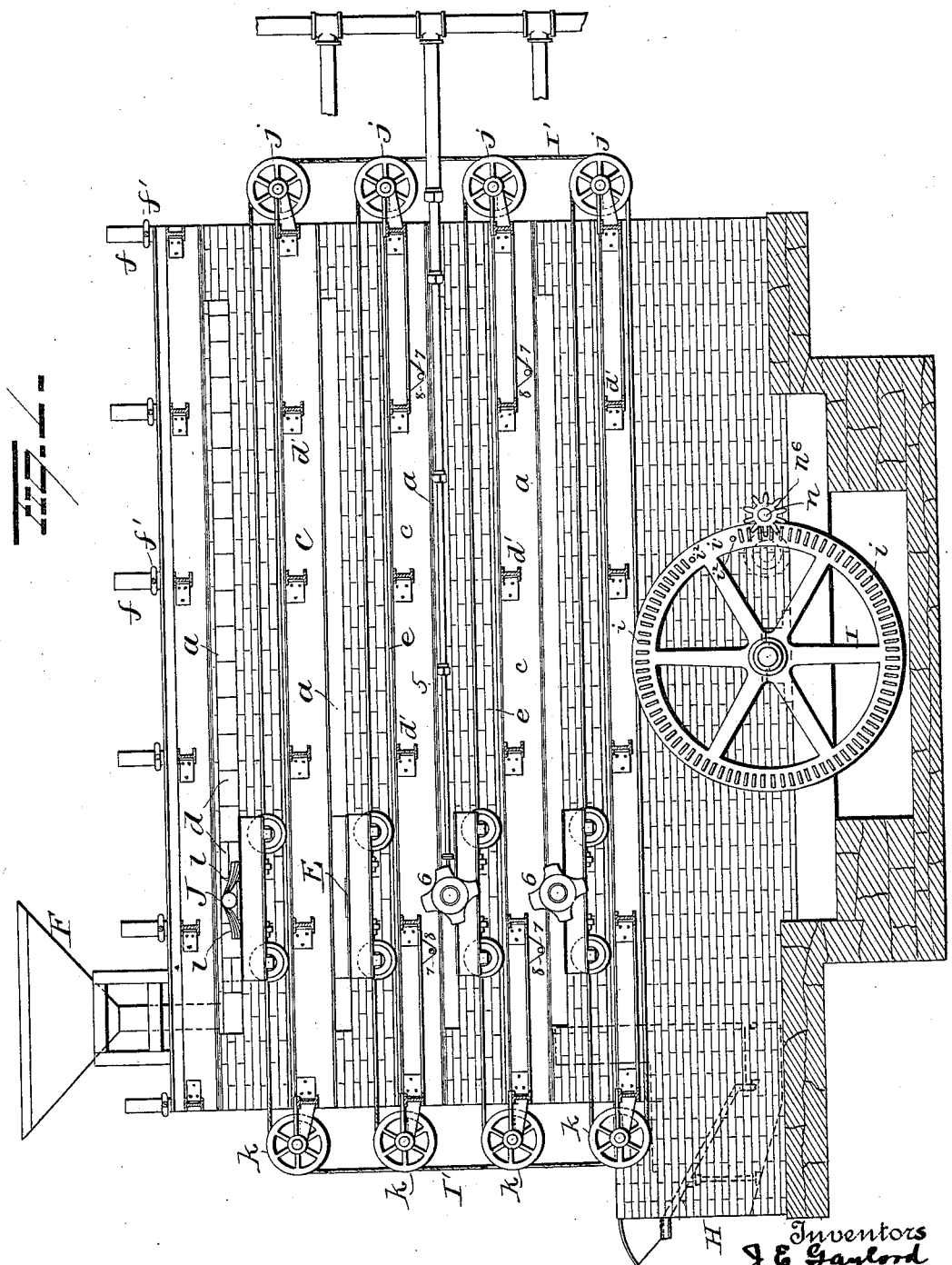
Witnesses
E. F. Nottingham
G. F. Downing
Inventors
J. E. Gaylord
H. A. Keller and
W. G. Cole
By H. A. Seymour
Attorney

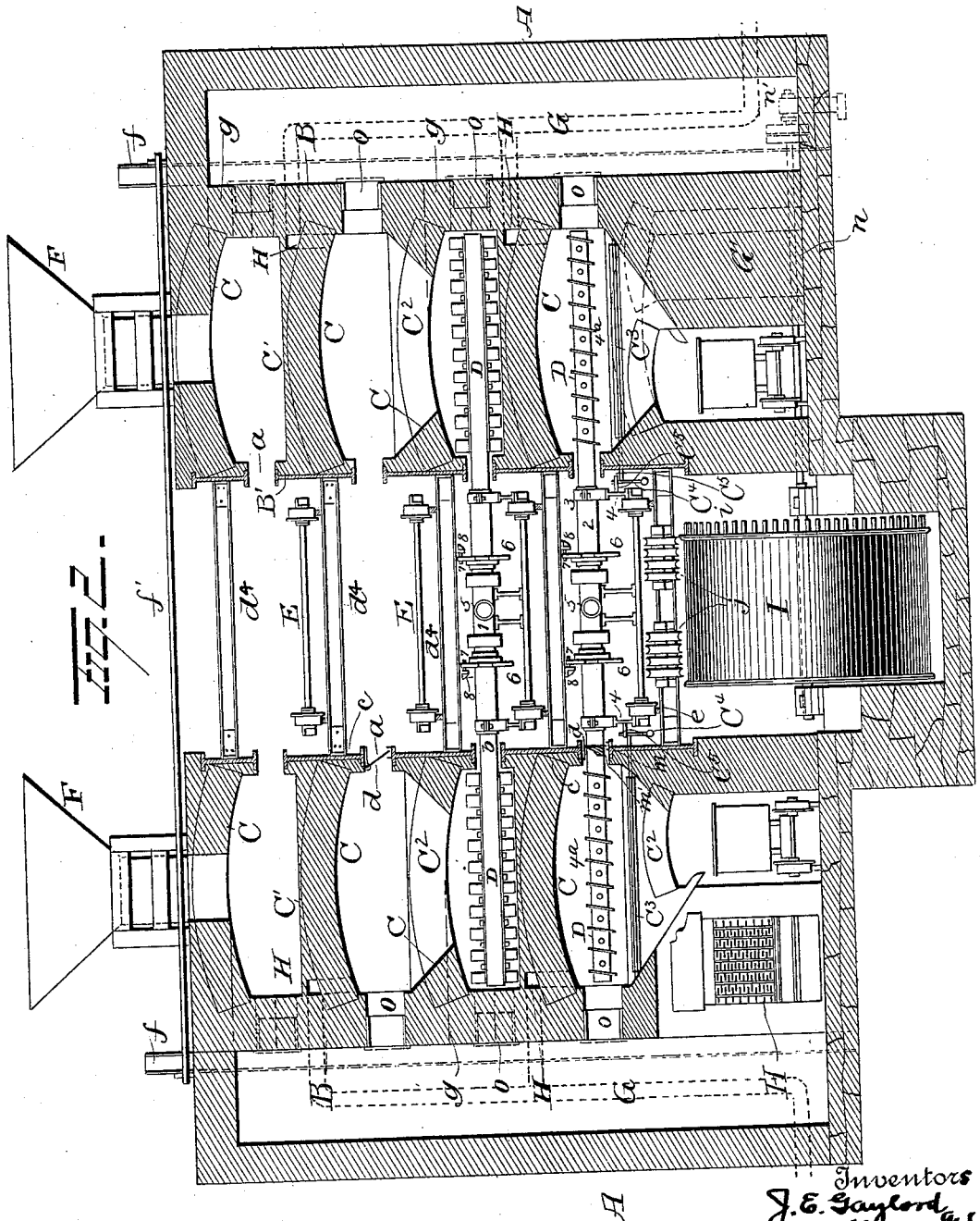

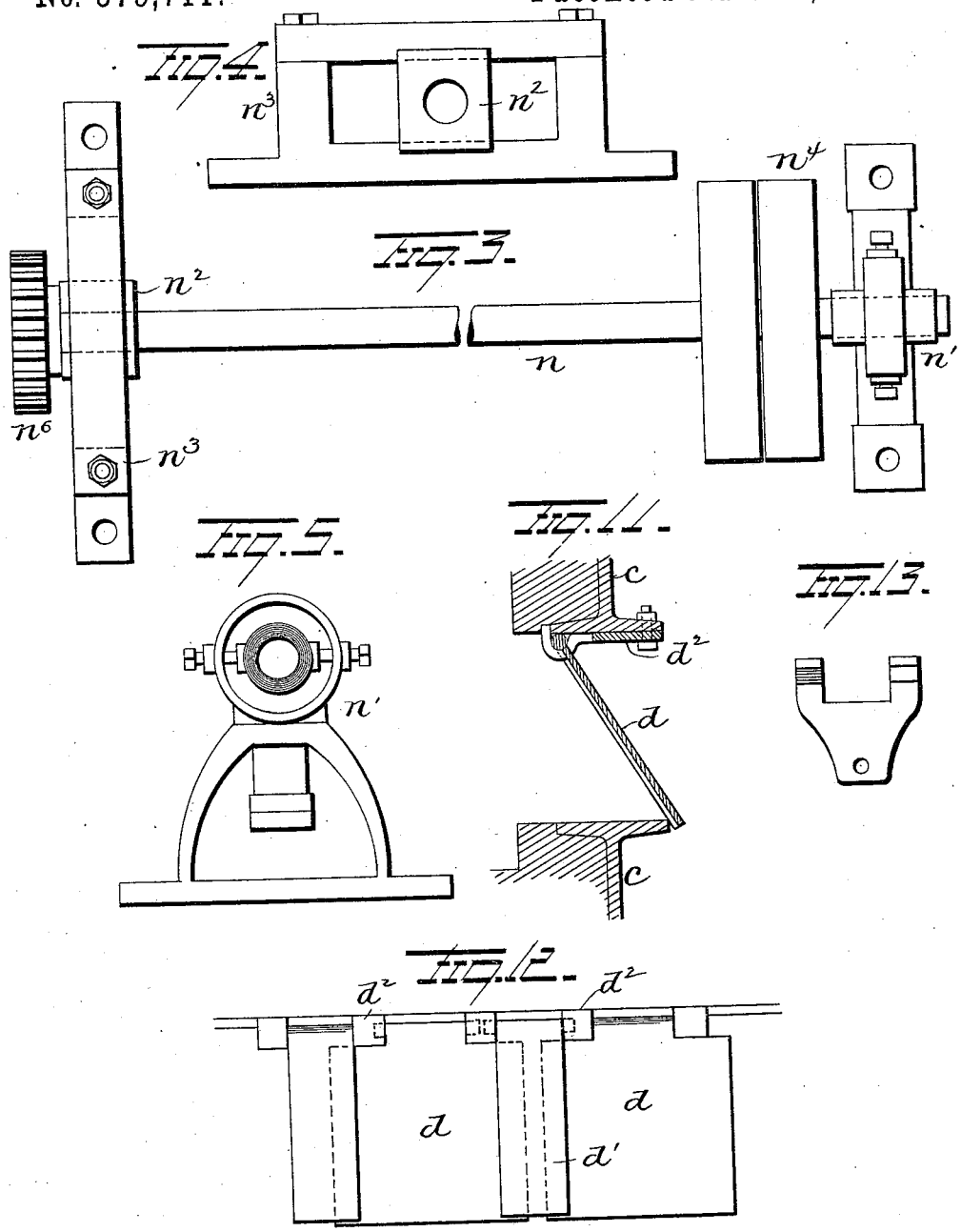

(No Model.) 6 Sheets—Sheet 4.
H. A. KELLER, W. G. COLE & J. E. GAYLORD.
ROASTING FURNACE.
No. 579,711. Patented Mar. 30, 1897.
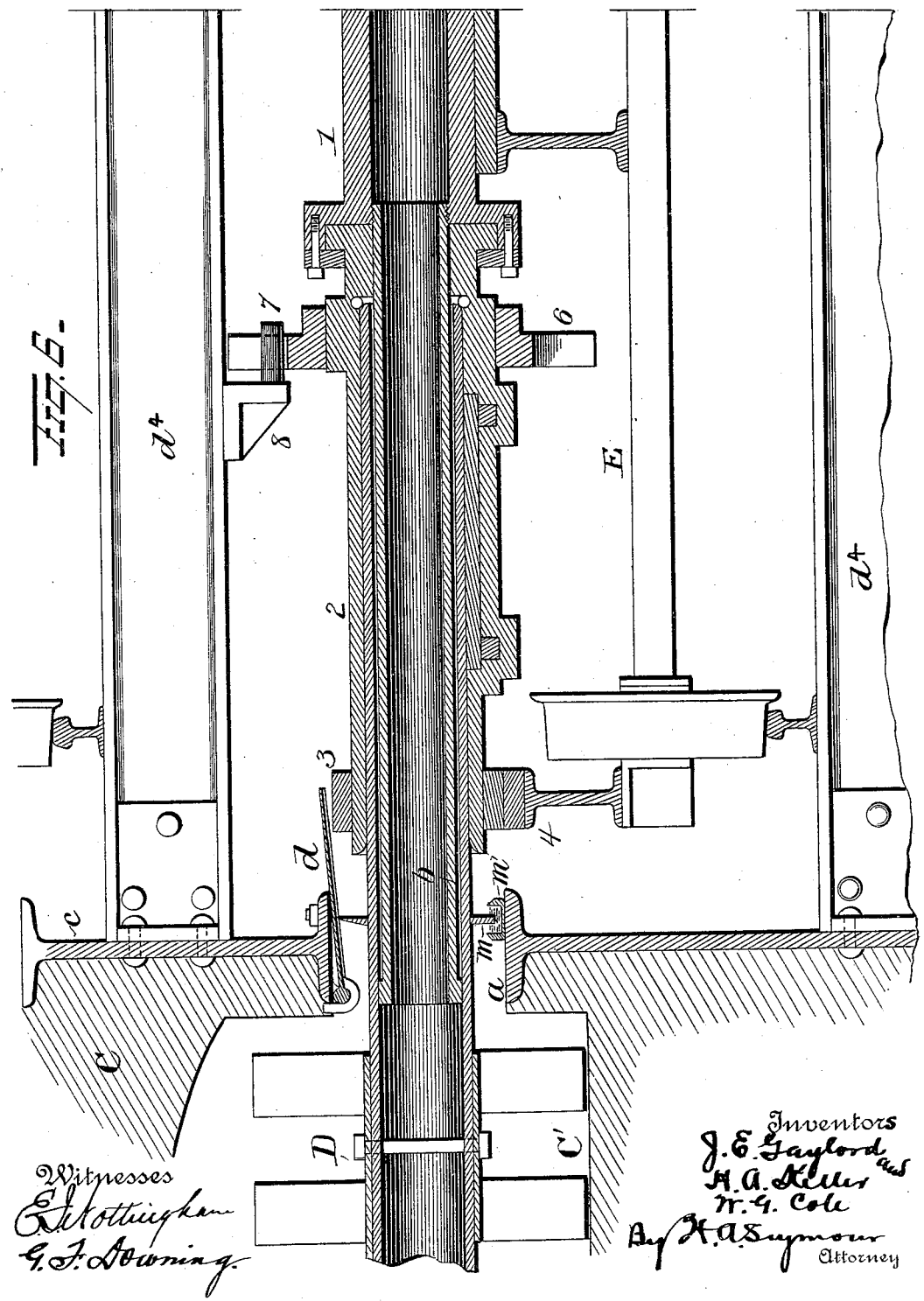

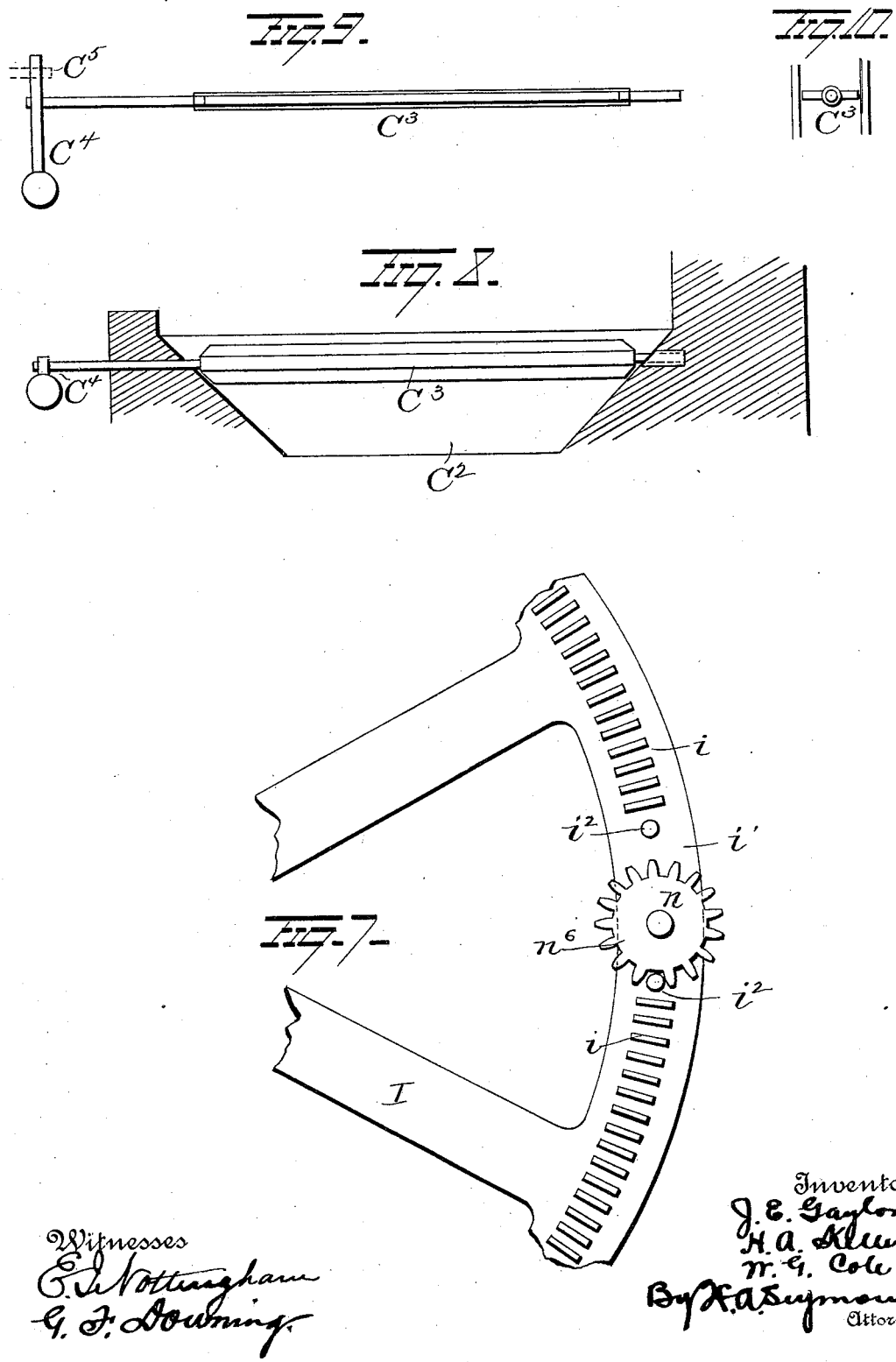

(No Model.) 6 Sheets—Sheet 6.
H. A. KELLER, W. G. COLE & J. E. GAYLORD.
ROASTING FURNACE.
No. 579,711. Patented Mar. 30, 1897.
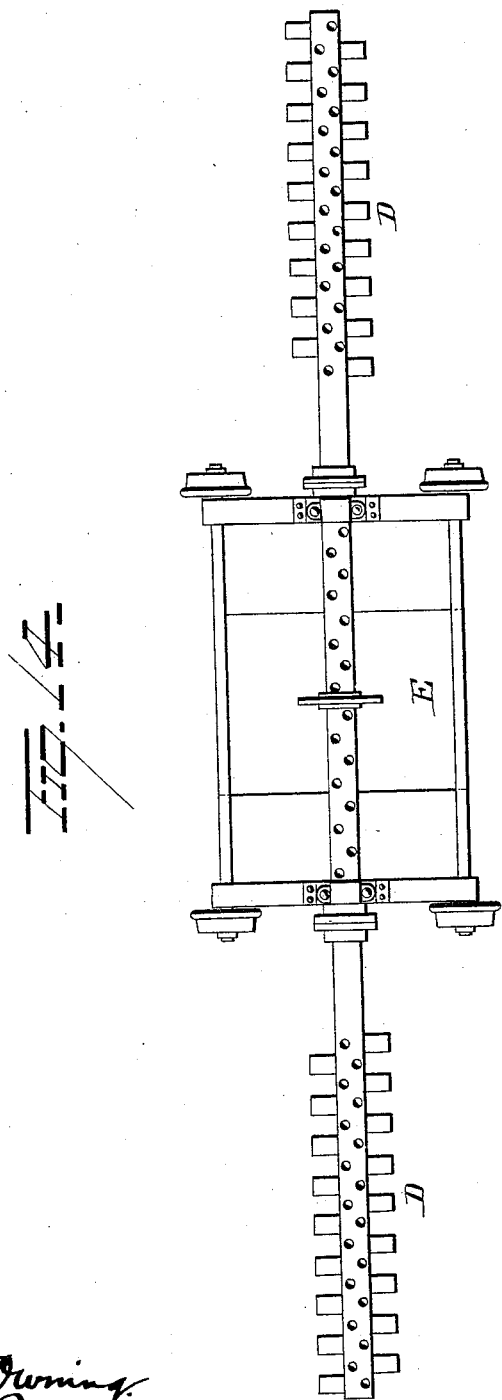
Witnesses
G. F. Downing
S. W. Foster
Inventors
H. A. Keller
W. G. Cole and
J. E. Gaylord
By H. A. Seymour
Attorney

UNITED STATES PATENT OFFICE.

HERMANN A. KELLER, WILLIAM G. COLE, AND JARED E. GAYLORD, OF BUTTE, MONTANA; SAID COLE ASSIGNOR TO ARTHUR HARVEY WETHEY, OF SAME PLACE.

ROASTING-FURNACE.

SPECIFICATION forming part of Letters Patent No. 579,711, dated March 30, 1897.

Application filed April 9, 1894. Serial No. 506,936. (No model.)

*To all whom it may concern:*

Be it known that we, HERMANN A. KELLER, WILLIAM G. COLE, and JARED E. GAYLORD, residents of Butte, in the county of Silver Bow and State of Montana, have invented certain new and useful Improvements in Roasting-Furnaces; and we do hereby declare the following to be a full, clear, and exact description of the invention, such as will enable others skilled in the art to which it appertains to make and use the same.

Our invention relates to an improvement in roasting-furnaces, and more particularly to that class of furnaces for drying, desulfurizing, cooling, or chloridizing ores or furnace products, in which a series of hearths are arranged one above the other and which communicate through alternate passages or openings near their ends, each hearth being provided with a rake for the purpose of mechanically stirring the bedded material and to propel said material along each hearth and to successively discharge it upon the one below until the roasted material passes out through the discharge in the lowest hearth.

The object of our invention is to insure the complete control of both the furnace and the operating mechanism, whereby the greatest possible quantity of heat generated in the process of roasting is preserved to the furnace for the purpose of aiding in the roasting of freshly-supplied material.

A further object is to reduce the cost of working and repairing by the removal of the mechanism, except the rake ends carrying the rake-teeth, entirely outside the furnace, such mechanism being made to occupy the smallest possible space.

With these objects in view the invention consists in certain novel features of construction, as hereinafter set forth, and pointed out in the claims.

In the accompanying drawings, Figure 1 is a longitudinal sectional view of our improved furnace with some of the parts removed. Fig. 2 is a cross-section with parts removed. Fig. 3 is an enlarged detail view showing shaft $n$. Fig. 4 is an end elevation of same. Fig. 5 is an opposite end view showing the swivel. Fig. 6 is an enlarged sectional view through arm 1 and connected parts. Fig. 7 is an enlarged detail view of the drum, showing the teeth thereon and the pinion on shaft $n$. Figs. 8, 9, and 10 are views of the valve $C^3$. Figs. 11, 12, and 13 are views of curtain and hinge connection thereof, and Fig. 14 is a detail view showing rake-heads D D.

In carrying out our invention we make use of two separate, preferably rectangular, structures, each having a series of horizontal communicating hearths. The hearths are provided with a corresponding number of reciprocating rakes, which are carried by trucks over tracks between said structures.

Our improved apparatus comprises, therefore, two distinct and separate parts—viz., a stationary structure and operating mechanism.

A A represent the two rectangular structures comprising the furnace, each structure having an outer wall B and an inner wall B'. Between the inner and outer walls of each structure A a series of arches C are sprung, and from the different levels, each arch forming the floor of one hearth and the roof of the next lower. The inner walls B' are provided with elongated openings $a$, one of such openings being provided for each hearth, for the accommodation of rakes D D, which extend over the hearths C', while their shanks $b$ project through said elongated openings and are supported in a manner hereinafter to be explained. The elongated openings $a$ are formed by the supporting I-beams $c$ and each is maintained normally closed by sectional drops or curtains $d\ d'$, the upper edges of said drops or curtains being connected with the upper I-beams by means of hinges $d^2$, adjustably connected to said I-beams, and resting at their lower edges against the I-beam which forms the lower wall of the elongated opening, said curtains or drops when closed being disposed in a slanting position. The edges of the sections $d$ of the curtains are disposed a short distance apart to allow for expansion and contraction, and the smaller sections $d'$ are adapted to overlap the joints between the larger sections. It sometimes becomes necessary to lower these curtains slightly in order to adjust them to the space between beams. This is accomplished by loosening the nuts on the bolts and inserting pieces of sheet metal between the face of the I-beam and the hinge. Located between the I-beams $c$ of the respective structures are I-beams $d^1$, which constitute braces and also serve to support tracks $e$, on which trucks E are adapted to move, for a purpose presently explained.

The entire structure is bound together by means of beams or girders $f$, placed against the outer walls of the respective structures, and rods $f'$, connecting the ends of the diametrically opposite beams or girders.

In each furnace the roasting takes place on the hearths C', which communicate through openings $C^2$, located near their respective ends. These openings serve for the double purpose of discharging the ore from one hearth upon the one directly below it, and also for causing the passage of the draft along the entire length of each hearth. Each furnace will be fed through a hopper F and discharged through the openings $C^2$ in the lowest hearth, which is provided with a valve $C^3$, maintained normally closed by a weighted arm $C^4$, secured to the extended journal of the valve. The valve $C^3$ will be automatically opened by a pin $C^5$, projecting from one of the carriages E, striking the upwardly-projecting end of the arm $C^4$, and said valve will be automatically closed by said weighted arm $C^4$.

To take off the gases, downtakes G are provided and made to act in connection with the flues G', situated beneath the lowest hearth. This hearth is thus provided with additional heat, very necessarily, as but little sulfur remains in the ore upon it. The downtakes G are provided with openings $g$ at every second hearth for the purpose of drawing off part of the vitiated air. This is to enable either pure air to take its place or to prevent the overcrowding of the passage $C^2$. To save floor-space, these openings $C^2$ are made small, and overcrowding them would cause the furnace to smoke, besides giving rise to an unusual amount of flue-dust. Flues H are made in the brickwork to lighten its weight and to heat air before entering the furnace through the roofs of the hearths. An auxiliary fireplace will preferably be employed and is represented in Figs. 1 and 2 as a mechanical stoker H'.

Located on each truck, preferably at the center thereof, is a tubular arm 1, with the ends of which sleeves 2 are revolubly connected, the ends of said sleeves being supported loosely in collars 3, mounted on brackets 4 at the sides of the truck E. The hollow shanks $b$ of the hollow heads of the rakes D enter said sleeves 2 and are adapted to turn with them. The teeth of each rake are preferably made to project in both directions, and between said teeth perforations $4^a$ are made in the hollow heads for the escape of air forced through a telescoping or flexible pipe 5, communicating with the hollow or tubular arm 1, one of such pipes being of course made to communicate with the hollow or tubular arm 1 on each truck and all the pipes connected with a common source of supply. Instead of forcing air through the water may be run into said rake-heads to cool them, in which case the rake-heads will not be perforated.

Each collar 2 has fixed to it a star-wheel 6, adapted to be engaged by pins 7, projecting from brackets 8, located at the end of the path of the trucks. The same devices are of course located on each truck E, and the trucks are moved from end to end of the furnace by means of the devices now to be described.

Between the structures A A and at the base thereof a large drum I is mounted and provided at one end with a series of preferably-elongated gear-teeth $i$, said series of teeth extending nearly the complete circumference of the drum and leaving a space $i'$ between its ends.

On the drum I a number of ropes or chains I' are coiled, the ends of said ropes being connected to the respective ends of the trucks E, two ropes being preferably provided for each truck. The ropes or chains I' will be preferably guided by means of guide-wheels $j$ $k$. Thus it will be seen that when the drum is rotated the trucks or carriages E will be moved from end to end of the apparatus, carrying with them the rakes D, the rakes on alternate hearths being adapted to act upon the material while the others are out of operative position and are moving back to their starting-point. Now when the rakes carried by one truck are moving forward toward the openings $C^2$ in the ends of the hearths their teeth will be in position to operate upon the material on the hearth, and when the truck reaches the end of its forward movement the star-wheels 6 on the sleeves 2 will engage the pins 7 and said sleeves and rakes will be made to make a quarter-turn, thus moving the rake-teeth out of operative position. When this truck is moved back to its starting-point, the star-wheel 6 will engage the pins 7 at that end of the furnace and the rakes will be made to again make a quarter-turn, bringing them again into operative position ready for a new stroke.

In order to provide means for raising the sections of the curtains as the rakes move from end to end of the furnace without interfering with the operation of said rakes, arms J are mounted on the rakes where they pass through the openings $a$ and provided with inclining faces $l$, adapted to engage the sections of the curtain and raise them successively as the rake moves from end to end of the furnace, said sections assuming their normal positions by their own gravity. The under edge of each arm J is preferably provided with a flange $m$, adapted to project into sand or water in trough $m'$ on the lower wall of each opening $a$, thus closing the temporary opening made by the raising of the curtain. In order to provide means for causing the drum I to turn alternately in reverse direction and thus impart a reciprocating motion to the carriages E, the devices now to be described will be employed. A shaft $n$ is mounted at one end in a swiveled bearing $n'$ and at its other end in a sliding bearing $n^2$, carried by a bracket $n^3$. The shaft $n$ is provided with a pinion $n^6$ and also with a pulley $n^4$, preferably near its swiveled end, to which motion is imparted continuously in the same direction from any convenient source of power. From this construction and arrangement of parts it will be seen that the shaft carrying the pinion $n$ is so constructed and arranged that when the drum I shall have nearly completed one revolution said pinion will move through the space $i'$ between the ends of the series of teeth $i$ (turning on one of the pins $i^2$ at the ends of the series of teeth) and mesh with said teeth at their opposite sides, thus causing the drum to rotate in the reverse direction while the pinion $n$ revolves continuously in the same direction. As long as the pinion $n$ revolves, the drum I will be made to oscillate and cause the trucks or carriages to move from end to end of the furnace. Other means might be employed for imparting motion to the carriages E. For instance, a hydraulic cylinder may be used for moving the carriages directly or in connection with the devices above described.

The furnaces may be provided with a series of floors, as above described, or only one floor, or a single furnace may be employed. In any event the operating mechanism will be entirely separated from the roasting-hearths and will not be affected by heat therefrom. Should it be desired to feed different ores of varying compositions, additional hoppers can be placed along upon the drying-floor, each hopper being made to feed any desired proportions of ores.

Having fully described our invention, what we claim as new, and desire to secure by Letters Patent, is—

1. The combination with a pair of roasting-furnaces each having an opening in one wall of stirring apparatus extending into each furnace, a truck located between the furnaces for carrying said stirring apparatus, a drum and ropes or chains connected with said truck and connected with said drum, substantially as set forth.

2. The combination with a pair of roasting-furnaces each having an opening in one wall and stirring apparatus extending into each furnace; of a drum, and ropes or chains connected with said stirring apparatus and coiled about said drum, whereby to cause said stirring apparatus to travel from end to end of said furnaces and means located between the furnaces for carrying said stirring apparatus, substantially as set forth.

3. The combination with a pair of furnaces arranged a suitable distance apart and having a space between them, said furnaces having openings in the inner wall, and hinged drop-curtains for closing said openings, of a movable device located in the space between the furnaces and rakes extending outward from the movable devices into the openings in the inner walls of the furnace, said rakes adapted to open the curtains as they move to and fro, substantially as set forth.

4. The combination with a pair of furnaces located some distance apart so that a space is formed between them, downtakes outside of the furnaces, said furnaces provided with openings in their inside walls, and drop-curtains for closing these openings, of a movable device located in the space between the inner walls and rakes projecting from the movable devices into the openings in the inside walls of the furnace, substantially as set forth.

5. In a roasting-furnace, the combination with a hearth having an opening in one wall thereof, of a curtain hinged to the wall of said opening and adapted to normally close the same, a rake adapted to project through said opening, an arm carried by said rake and adapted to raise said curtain to permit the passage of the rake, a flange projecting from said arm and a trough adapted to contain sand or water, into which said flange projects, substantially as set forth.

6. In a roasting-furnace, the combination with a hearth and a rake having a perforated hollow head, of means for carrying said rake and an extensible telescoping pipe for conveying fluid to said rake-head, substantially as set forth.

7. In a roasting-furnace the combination with two parallel structures having an open space between them, and openings in their inner walls each having a hearth, of a rake over each hearth and means located in the space between the hearths for carrying both of said rakes, substantially as set forth.

8. In a roasting-furnace, the combination with two parallel structures having openings in their inner walls hearths, and a rake adapted to operate over each hearth, of operating devices, located between said structures and connected with both of said rakes, substantially as set forth.

9. In a roasting-furnace the combination with two parallel structures, having openings in their inner walls and each structure having a hearth and a rake adapted to operate over each hearth, of a truck adapted to travel between said structures and to carry both of said rakes, substantially as set forth.

10. In a roasting-furnace, the combination with two parallel structures, having openings in their inner walls and each structure having a hearth, of a truck adapted to travel between said structures and carry both of said rakes and means for causing said rakes to make a partial revolution at each end of its stroke, substantially as and for the purpose set forth.

11. A roasting-furnace comprising two parallel structures, beams supporting the inner sides thereof, braces extending from one beam to the other, beams or girders outside of said structures, and tie-rods extending from one girder to the other for holding them together and giving lateral support thereto, substantially as set forth.

12. In a roasting-furnace, the combination with two parallel structures, having openings in their inner walls and each structure having a series of hearths, the alternate ends of said hearths being adapted to communicate, of trucks located between said structures, rakes adapted to operate over said hearths and carried by said trucks, and devices for automatically causing said rakes to assume an operative position during their forward movement and an inoperative position during their return stroke, substantially as set forth.

13. The combination with a roasting-furnace having an opening in one side wall, and a hearth, of a truck, a rake carried by said truck and adapted to operate over said hearth, a drum, a rope or chain coiled about said drum and connected with said truck, a series of gear-teeth projecting from said drum, a shaft and a pinion carried by said shaft, said pinion being adapted to mesh alternately with opposite sides of said gear-teeth, whereby to cause said drum to oscillate and cause the truck to travel back and forth, substantially as set forth.

14. The combination with parallel furnaces having longitudinal slots in their adjacent sides with movable doors, of plows or stirrers extending into the furnaces through said slots, and having an operating mechanism intermediate of the furnaces for operating them simultaneously, the said doors being constructed to move and allow the passage of the plows and then return to place after they have passed.

15. In a roasting-furnace, the combination with two parallel structures having an open space between them, and longitudinal slots in the inside walls of the structures, each structure having a hearth, of a rake over each hearth, and means located in the space between the hearths for carrying both of said rakes, substantially as set forth.

16. In a roasting-furnace, the combination with two parallel structures having hearths, and a rake adapted to operate over each hearth, of carrying devices located in the space between said structures and connected with both of said rakes, substantially as set forth.

17. In a roasting-furnace, the combination with two parallel structures, each having a hearth and the inner wall of each structure having a longitudinal slot, and a rake adapted to operate over each hearth, of a truck adapted to travel between said structures and to carry both of said rakes, substantially as set forth.

In testimony whereof we have signed this specification in the presence of two subscribing witnesses.

HERMANN A. KELLER.
WILLIAM G. COLE.
JARED E. GAYLORD.

Witnesses:
ROBT. J. GRANT,
WILBUR G. BENHAM.